(12) United States Patent
Sheikh

(10) Patent No.: US 11,566,873 B2
(45) Date of Patent: *Jan. 31, 2023

(54) SELF DEFENSE PHONE CASE AND METHOD OF USE

(71) Applicant: Yawar Sheikh, Altamonte Springs, FL (US)

(72) Inventor: Yawar Sheikh, Altamonte Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,498

(22) Filed: Apr. 24, 2020

(65) Prior Publication Data

US 2021/0041210 A1 Feb. 11, 2021

Related U.S. Application Data

(63) Continuation of application No. 16/520,619, filed on Jul. 24, 2019, now Pat. No. 10,634,460.

(60) Provisional application No. 62/702,588, filed on Jul. 24, 2018.

(51) Int. Cl.
*F41H 9/10* (2006.01)
*H04B 1/3888* (2015.01)

(52) U.S. Cl.
CPC ............. *F41H 9/10* (2013.01); *H04B 1/3888* (2013.01)

(58) Field of Classification Search
CPC ... F41H 9/10; H04M 1/72424; H04M 1/0249; H04M 1/72421; A61H 2033/021; H01M 8/04186; H01M 8/04201; H04B 1/3888; A45C 2011/002; A45C 11/00; A45C 13/002; A45C 13/02; A45F 2200/0516
See application file for complete search history.

(56) References Cited

U.S. PATENT DOCUMENTS

| | | | | |
|---|---|---|---|---|
| 10,230,827 | B2* | 3/2019 | DiPerna | H04M 1/026 |
| 2010/0184454 | A1* | 7/2010 | Luft | H04W 48/02 |
| | | | | 455/456.5 |
| 2013/0310049 | A1* | 11/2013 | Siegel | H04M 1/72412 |
| | | | | 455/445 |
| 2014/0357330 | A1* | 12/2014 | Lin | H04M 1/0283 |
| | | | | 455/575.8 |
| 2015/0366312 | A1* | 12/2015 | Kay | H05K 5/069 |
| | | | | 224/191 |
| 2017/0095065 | A1* | 4/2017 | Colbert | B65D 43/22 |
| 2019/0109932 | A1* | 4/2019 | Higgins | H04W 4/90 |
| 2019/0310049 | A1* | 10/2019 | Stilson | F41H 9/10 |

FOREIGN PATENT DOCUMENTS

EP 2905571 A1 * 8/2015 ............. A45C 11/00

* cited by examiner

*Primary Examiner* — Khalid W Shaheed
(74) *Attorney, Agent, or Firm* — West & Associates, A PC; Stuart J. West; Charlotte Rodeen-Dickert

(57) ABSTRACT

A phone case with a liquid vessel contained therein for emitting a spray, such as a spray for self-defense or any other practical use, includes a case body extending from a first end to a second end, the case body to secure to a phone; a cavity disposed between an interior surface and an exterior surface of the case body; a button extending through a first opening of the case body and into the cavity; a nozzle extending through a second opening of the case body and into the cavity; and a vessel mounted within the cavity and engaged with the button and in fluid communication with the nozzle; activation of the button activates spray from the vessel through the nozzle.

20 Claims, 5 Drawing Sheets

SELF DEFENSE PHONE CASE AND METHOD OF USE

BACKGROUND

1. Field of the Invention

The present invention relates generally to self-defense systems, and more specifically, to a phone case with a spray included therein, such as a self-defense spray or other liquid spray, and wireless technology to allow for transmitting notices and/or alerts.

2. Description of Related Art

Self-defense systems are well known in the art and are effective means to aid in providing the user with protection. For example, FIG. 1 depicts a flowchart 101 of a common method, wherein a user carries a phone, self-defense spray, wallet, and the like, as shown with box 103. Upon coming into a dangerous situation, the user may not have immediate access to the spray, as shown with boxes 105, 107. In addition, it is common for a user to forget to carry their spray at all times, thereby leaving them vulnerable to attacks with limited defense.

Accordingly, although great strides have been made in the area of self-defense systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
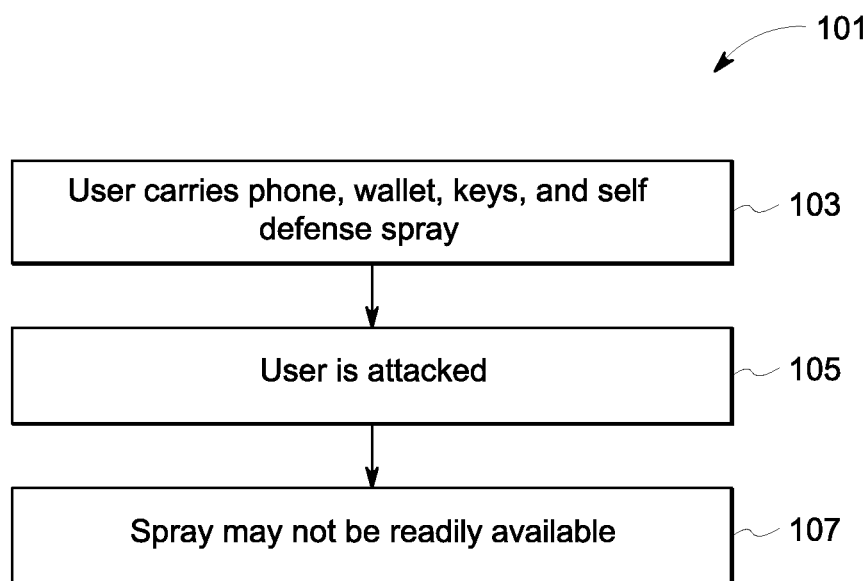
FIG. 1 is a flowchart of a common self-defense method.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The preferred usage of the embodiment may vary depending on the liquid spray contained therein, as will be discussed herein. The present invention could be used for self-defense, industrial uses, home uses, or any other purpose.

The system and method of use in accordance with the present application overcomes one or more of the above-discussed problems commonly associated with conventional self-defense systems or the need to have any liquid conveniently and immediately accessible for dispensation. Specifically, the present invention provides for a self-defense system built into a mobile phone cover, thereby being convenient for the user to carry at all times. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
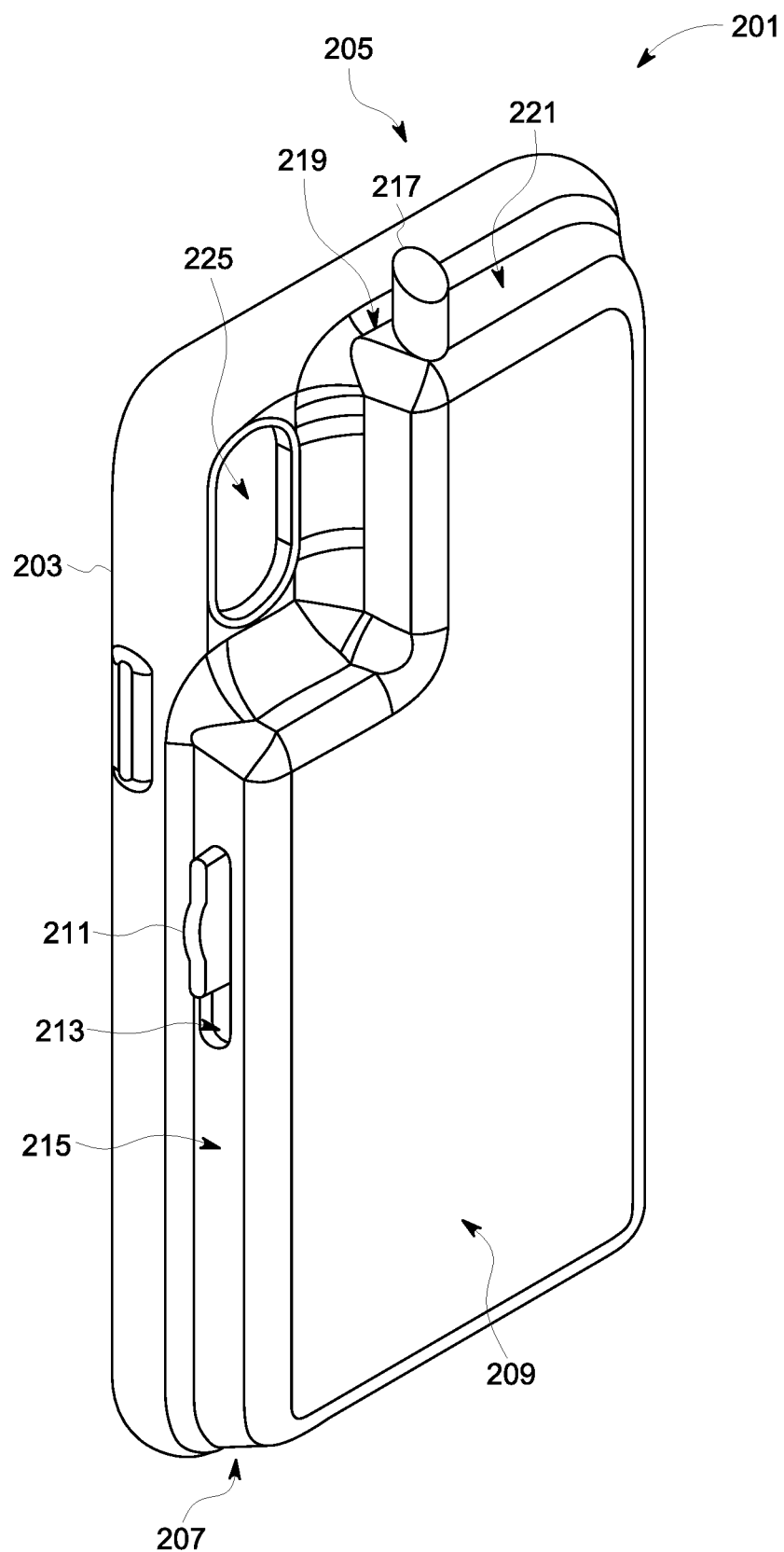
FIG. 2 is an isometric view of a phone case in accordance with a preferred embodiment of the present application.
Figure 3:
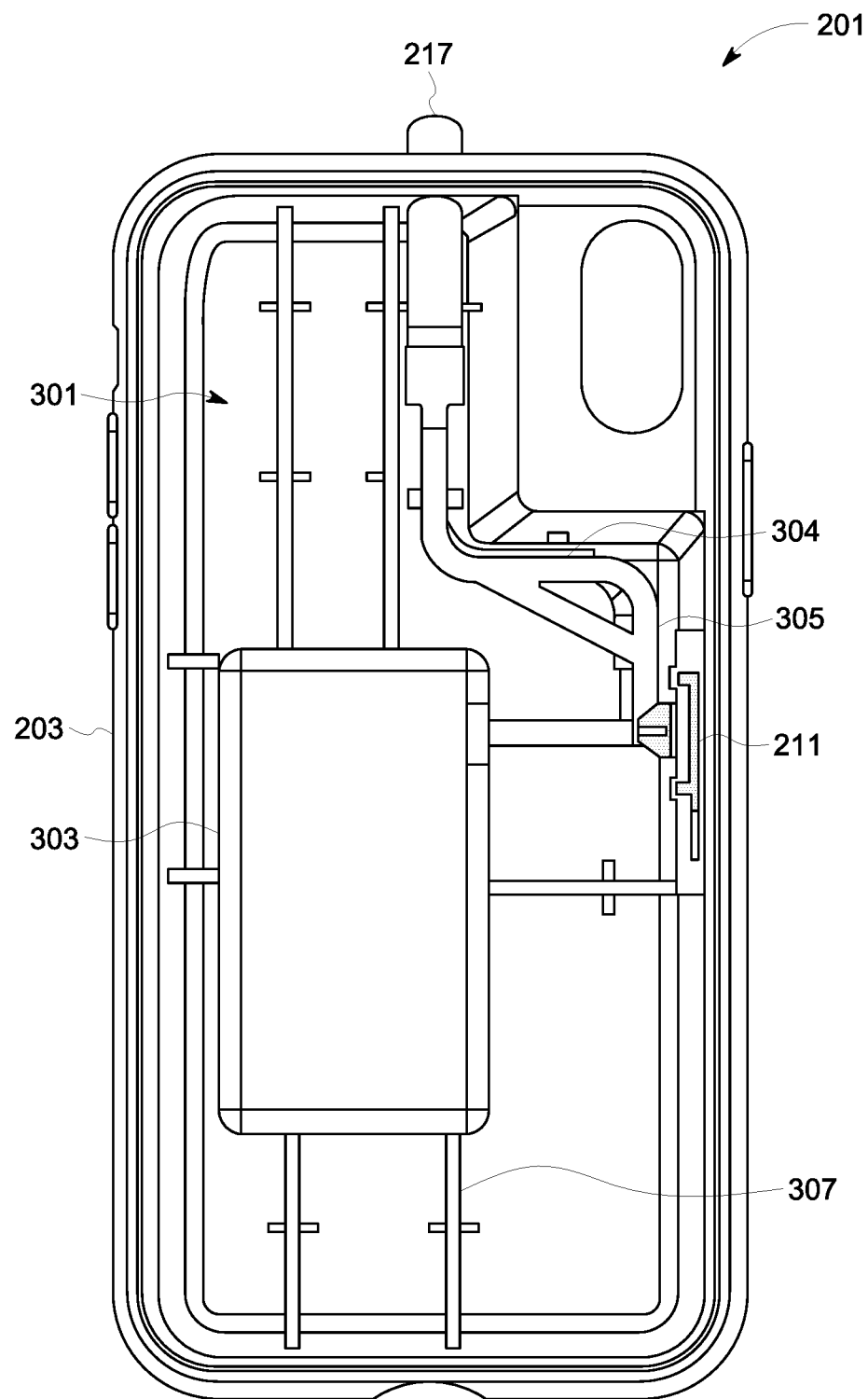
FIG. 3 is a back view of the phone case of FIG. 2.
Figure 4:
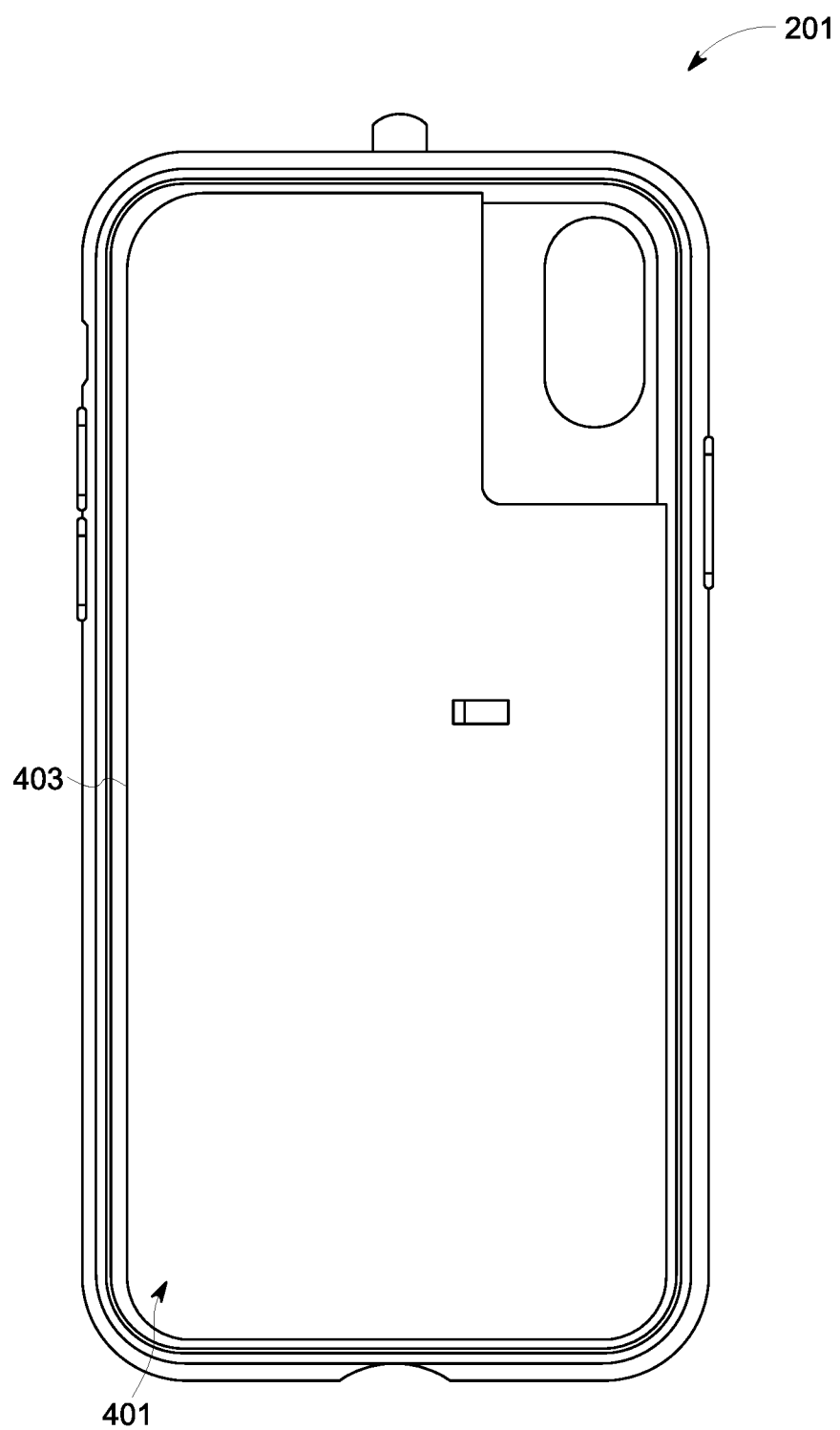
FIG. 4 is a back view of the phone case of FIG. 2 with a cover attached thereto.

Referring now to the drawings wherein like reference characters identify corresponding or similar elements throughout the several views, FIGS. 2-4 depict various views of a phone case 201 in accordance with a preferred embodiment of the present application. It will be appreciated that case 201 overcomes one or more of the above-listed problems commonly associated with conventional self-defense systems.

In the contemplated embodiment, case 201 includes a body 203 extending from a first end 205 to a second end 207, wherein a cavity 301 is disposed between an interior surface 401 and an exterior surface 209. In the preferred embodiment, the cavity 301 houses a vessel 303 with a fluid contained therein. It should be appreciated that the fluid could be any self-defense spray, such as pepper spray. In additional embodiments, the liquid could vary, such as being for household or industrial purposes, or any other practical purpose. It should further be appreciated that the vessel 303 can be removed and re-filled from the cavity, thereby allowing for the user to refill the vessel as necessary as opposed to purchasing a new phone case.

As shown, a button 211 extends into the cavity from a first opening 213, thereby being accessible on a side wall 215 of the case body. In the preferred embodiment, the button is a 2-step button that thereby prevents accidental activation. In some embodiments, the 2-step activation requires the user to slide the button downward or upward and then press the button for activation. As shown, a nozzle 217 extend through a second opening 219 into the cavity and is in fluid communication with the vessel. In the preferred embodiment, the nozzle 217 extends through a top wall 221 of the body.

During use, the button 211 is activated, such as by a sliding motion, wherein the activation forces fluid flow from the vessel to the nozzle. As shown, there can be one or more straws 304 or couplings 305 configured to further facilitate the fluid flow. It is contemplated that the vessel can be mounted in the cavity in any number of ways, such as through one or more brackets 307. In addition, it is contemplated that the vessel can be removable and refillable/replaceable in some embodiments.

In FIG. 4, an interior view of case 201 is shown. It is contemplated that an interior panel 403 can be configured to snap over the cavity, thereby enclosing the components therein.

It should be appreciated that the case can be adapted to fit various styles of phones, and accordingly, can include various openings 225 as needed for speakers, ports, cameras, or the like. Further, it should be appreciated that the case provides for phone protection from damage and the like. In addition, it should be appreciated that in the preferred embodiment, the case is substantially flat, thereby allowing for easy carrying by the user. It is contemplated that in some embodiments, the case can have a width (distance from a back of the phone to a back surface of the case) of less than one inch, thereby again being able to easily fit in a pocket or the like.

Figure 5:
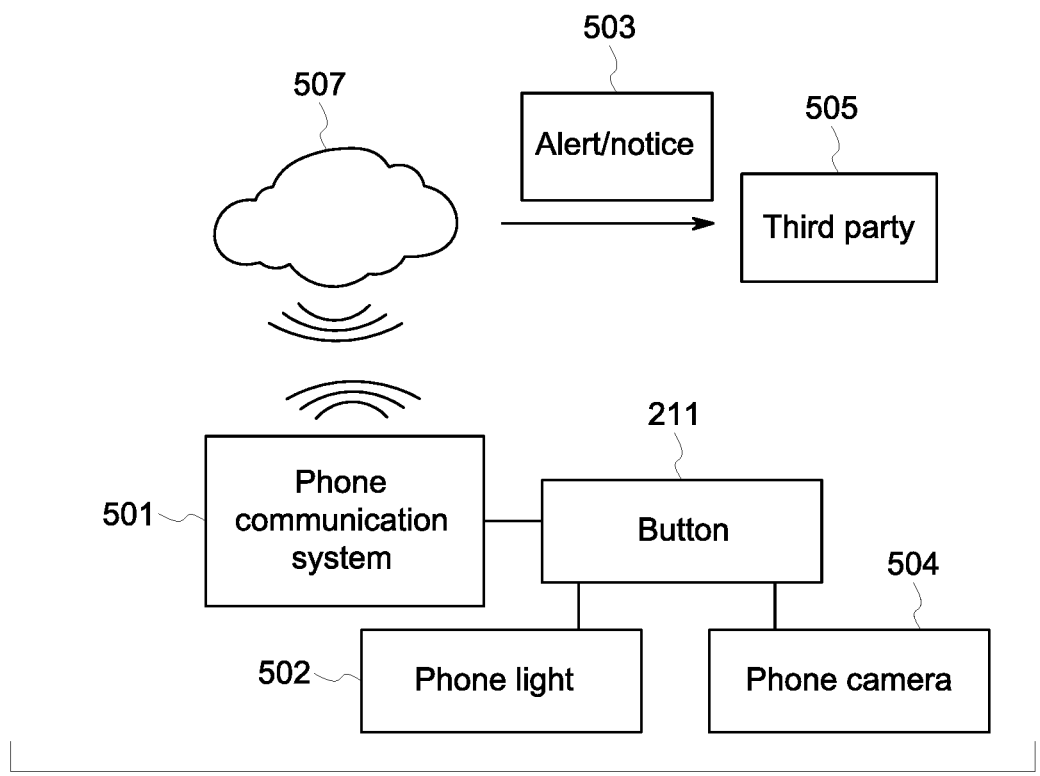
FIG. 5 is a schematic of a communication system in accordance with an alternative embodiment of the present invention.

In FIG. 5, a schematic depicts an alternative feature contemplated in the present invention. It is contemplated that the button 211 can be in communication with a communication system 501, such as the phone communication system, wherein activation of the button 211 facilitates activations of an alert/notice 503 to a third party 505 through a wireless network 507. The alert can include a GPS location. In addition, as shown, the button 211 can be in communication with the phone camera 504 and/or light 502, wherein activation of the button 211 could facilitate the capturing and transmission of photos or the flashing of the light. These features provide for notification to emergency responders, friends, family, or the like, thereby notifying that the user has used the self-defense case.

Figure 6:
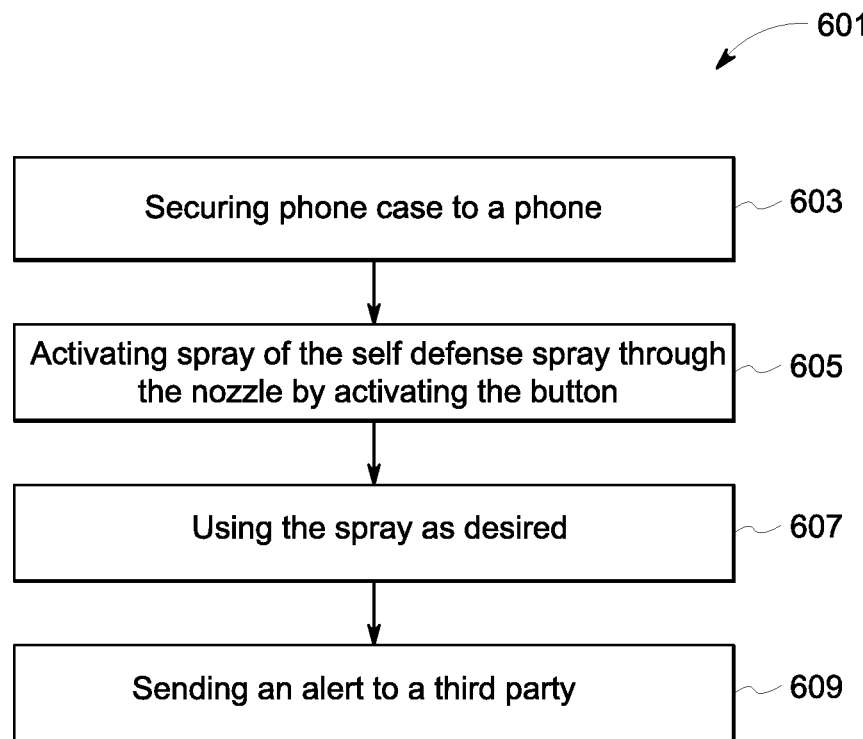
FIG. 6 is a flowchart of the method of use of the system of the present invention.

In FIG. 6, a flowchart 601 depicts the method of use associated with the system of the present invention. During use, the user secures the case body to their phone, as shown with box 603. As needed in a dangerous situation, the user can activate the spray through the nozzle by activating the button, as shown with box 605. The user can then use the spray as desired, as shown with box 607. In some embodiments, activation of the spray will further activate sending of an alert to a third party, as shown with box 609.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A phone case, comprising:
   a case body extending from a first end to a second end, the case body configured to secure to a phone, the case having at least one side;
   a cavity disposed between an interior surface and an exterior surface of the case body;
   a multi-step button extending through a first opening of the case body and into the cavity, the multi-step button being positioned on the at least one side of the case;
   a nozzle extending through a second opening of the case body and into the cavity, the nozzle extending through the case body;
   a substantially rectangular vessel having a depth of less than one inch and a substantially flat rear surface and a substantially flat front surface mounted within the cavity and engaged with the button and in fluid communication with the nozzle via a conduit; and
   at least one bracket supporting said substantially rectangular vessel within said cavity;
   wherein activation of the multi-step button activates spray from the vessel through the nozzle.

2. The phone case of claim 1, further comprising:
   an interior panel configured to snap into the case body to form the interior surface.

3. The phone case of claim 1, wherein the body has a depth of less than one inch.

4. The phone case of claim 3, wherein the case body has a substantially flat rear surface.

5. The phone case of claim 1, further comprising:
   a communication system in communication with the button;
   wherein activation of the button activates the communication system to transmit a notice to a third party via a phone.

6. The phone case of claim 1, wherein the vessel is configured to be removed and re-filled.

7. The phone case of claim 1, wherein the button is in communication with a phone camera and a phone light and configured to activate the phone camera and phone light.

8. A phone case, comprising:
   a case body extending from a first end to a second end, the case body configured to secure to a phone, the case having at least one side and a substantially flat exterior surface;
   a cavity disposed between an interior surface and the substantially flat exterior surface of the case body;
   a button extending through a first opening of the case body and into the cavity, the button being positioned on the at least one side of the case;
   a nozzle extending through a second opening of the case body and into the cavity, the nozzle extending through the case body;
   a substantially rectangular vessel having a depth of less than one inch and a substantially flat rear surface and a substantially flat front surface mounted within the cavity and engaged with the button and in fluid communication with the nozzle via a conduit; and
   at least one bracket supporting said substantially rectangular vessel within said cavity;
   wherein activation of the button activates spray from the vessel through the nozzle.

9. The phone case of claim 8, further comprising:
   an interior panel configured to snap into the case body to form the interior surface.

10. The phone case of claim 8, wherein the body has a width of less than one inch.

11. The phone case of claim 8, further comprising:
a communication system in communication with the button;
wherein activation of the button activates the communication system to transmit a notice to a third party via a phone.

12. The phone case of claim 8, wherein the vessel is configured to be removed and re-filled.

13. The phone case of claim 8, wherein the button is in communication with a phone camera and a phone light and configured to activate the phone camera and phone light.

14. A phone case, comprising:
a case body extending from a first end to a second end, the case body configured to secure to a phone, the case having a first side and an opposing second side;
a cavity disposed between an interior surface and the substantially flat exterior surface of the case body;
a multi-step button extending through a first opening of the case body and into the cavity, the multi-step button being positioned on the first side of the case;
a nozzle extending through a second opening of the case body and into the cavity, the nozzle extending through the case body;
a substantially rectangular vessel having a depth of less than one inch and a substantially flat rear surface and a substantially flat front surface mounted within the cavity and engaged with the multi-step button and in communication with the nozzle via a conduit; and
a plurality of brackets supporting said substantially rectangular vessel within said cavity;
wherein activation of the multi-step button activates spray from the vessel through the nozzle.

15. The phone case of claim 14, further comprising:
an interior panel configured to snap into the case body to form the interior surface.

16. The phone case of claim 14, wherein the case body has a depth of less than one inch.

17. The phone case of claim 16, wherein the case body has a substantially flat rear surface.

18. The phone case of claim 14, further comprising:
a communication system in communication with the multi-step button;
wherein activation of the multi-step button activates the communication system to transmit a notice to a third party via a phone.

19. The phone case of claim 14, wherein the vessel is configured to be removed and re-filled.

20. The phone case of claim 14, wherein the multi-step button is in communication with a phone camera and a phone light and configured to activate the phone camera and phone light.

* * * * *